United States Patent [19]
Barthelmes et al.

[11] 4,195,659
[45] Apr. 1, 1980

[54] TENSION CONTROL FOR A VALVE

[75] Inventors: Rainer Barthelmes; Heinrich Räthel, both of Bamberg, Fed. Rep. of Germany

[73] Assignee: Robert Bosch GmbH, Stuttgart, Fed. Rep. of Germany

[21] Appl. No.: 820,065

[22] Filed: Jul. 28, 1977

[30] Foreign Application Priority Data

Sep. 21, 1976 [DE] Fed. Rep. of Germany ... 7629406[U]

[51] Int. Cl.[2] .................... F02M 39/00; G05D 7/01

[52] U.S. Cl. .................... 137/501; 123/139 AW; 267/175

[58] Field of Search .................... 137/501, 859; 123/139 AW; 267/175, 177

[56] References Cited

U.S. PATENT DOCUMENTS

| | | | |
|---|---|---|---|
| 2,518,894 | 8/1950 | Humbarger | 267/175 X |
| 3,289,692 | 12/1966 | Dunn | 267/175 X |
| 3,777,725 | 12/1973 | Stumpp | 123/139 AW |
| 3,951,121 | 4/1976 | Passera | 123/139 AW |

*Primary Examiner*—Robert G. Nilson
*Attorney, Agent, or Firm*—Edwin E. Greigg

[57] ABSTRACT

A diaphragm valve which may serve as an equal pressure valve or as a pressure equalizing valve of a fuel metering and distributing unit for an externally ignited internal combustion engine. The valve has a flexible diaphragm the diameter of which is clamped between the housing and a bottom plate. Included is an adjusting device for controlling tension of a spring that encompasses the stem of the valve with the lower surface of the spring arranged to rest on the upper surface of the diaphragm. The adjusting device is disposed at an angle relative to the valve axis and engages the rim of a plate that is chamfered to correspond to the inclination of the adjusting member. By means of the adjusting device, the spring plate can be minutely adjusted in its axial position thereby changing the valve spring tension.

3 Claims, 2 Drawing Figures

TENSION CONTROL FOR A VALVE

BACKGROUND OF THE INVENTION

Diaphragm valves that are separated into two chambers with one chamber being arranged to include a fixed valve stem having an aperture arranged to be controlled by the diaphragm are well-known. One known valve having an adjusting device has the valve spring supported on a spring plate, which is guided by threads on the valve support carrier and includes a ring gear in which a pinion engages. It is furthermore known to adjust the spring plate of the valve spring by means of a threaded element that extends through a rocker. These adjusting devices, however, have the disadvantage of being very expensive to produce, but also difficult to mount in the motor vehicle.

OBJECT AND SUMMARY OF THE INVENTION

The primary object of the invention is to provide a diaphragm valve which includes the advantage of an easy and rapid adjustability of the tension of a valve spring that abuts the diaphragm.

A further object of the invention is the low cost of production, ease of construction, and the facility of assembly of the movable valve part which can be mounted without tension.

Also, another distinct advantage of the invention is to provide an arrangement in which the adjusting means for applying tension on the diaphragm is sealed against rotary movement.

These and other objects and advantages of the invention will be better understood and become more apparent from the ensuing detailed specification of a preferred embodiment taken in conjunction with the drawings.

BRIEF DESCRIPTION OF THE DRAWINGS

An exemplary embodiment of the novelty is represented in the drawings in a simplified form, and is described in more detail in the following description in which.

DESCRIPTION OF THE PREFERRED EMBODIMENT

Figure 1:
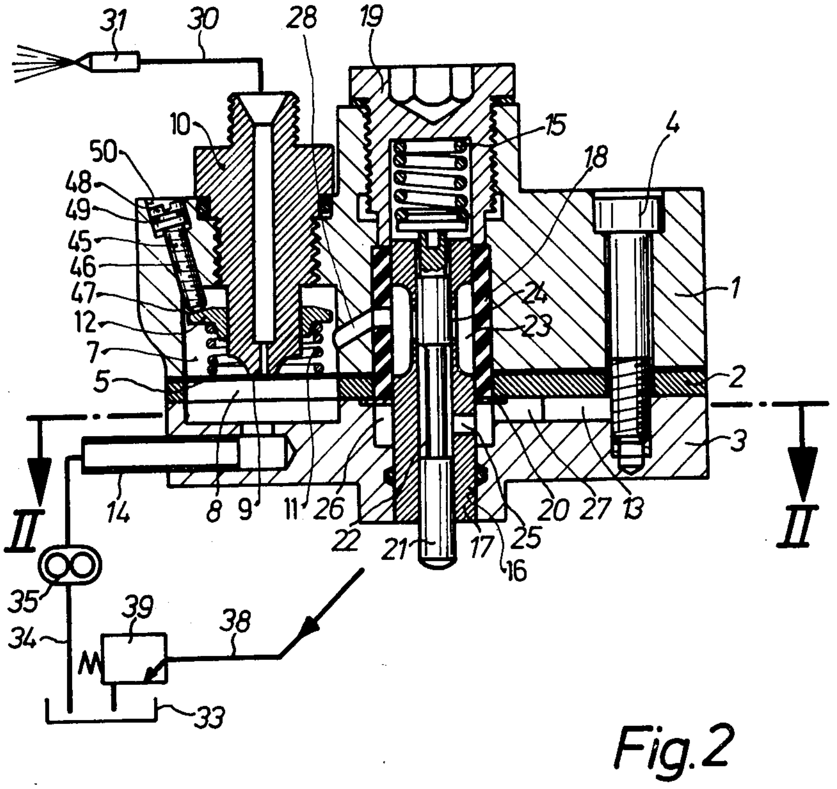
FIG. 1 is an axial sectional view of an exemplary embodiment of a fuel injection system which includes a diaphragm valve according to the present invention.
Figure 2:
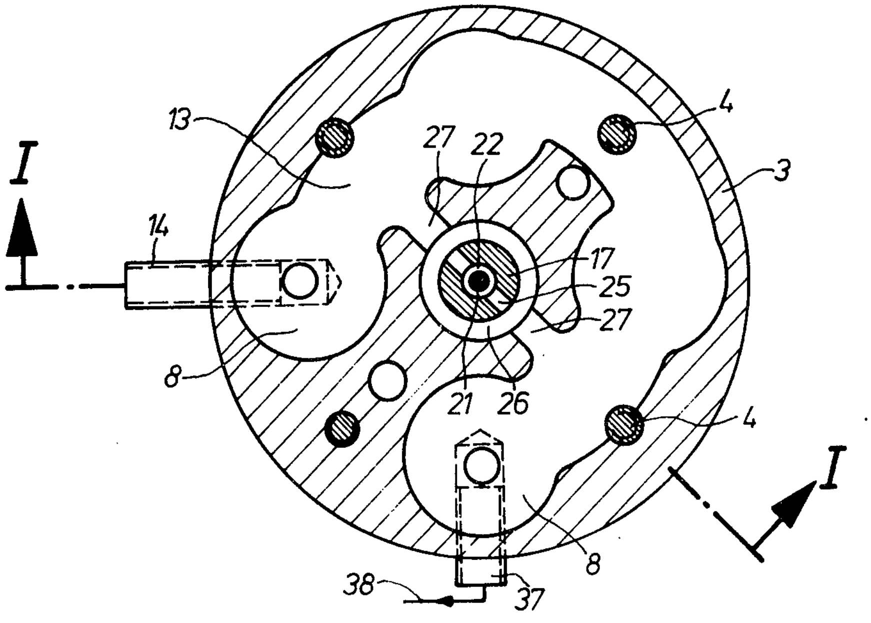
FIG. 2 is a cross-sectional view along the line II—II of FIG. 1.

In the valve with an adjusting device as shown in FIGS. 1 and 2, we are concerned with a fuel metering and volume divider of a fuel injection device with a housing 1, an intermediate plate 2 and a bottom cover plate 3, all of which are fastened together by a plurality of threaded elements as indicated at 4. Between the housing 1 and the intermediate plate 2, a membrane 5 is stretched, this being arranged to serve as the movable valve part to divide the axial bore through the housing 1 into upper and lower chambers 7 and 8.

The illustrated valve was designed as a fuel metering and volume divider valve for a four cylinder engine, and includes four membrane valves, all of which will be better understood as the description progresses. In each of these valves the membrane, together with a fixed valve seat 9, which is disposed in abutment with one planar surface of the membrane is arranged to form a flat seat valve.

The valve seat 9 is part of a valve carrier 10, which is threaded into the housing 1 and serves as the connecting piece for the line 30, which leads to the fuel injection valves 31, of which only one is shown. A valve spring 11 is positioned about the stem of carrier 10, as shown in FIG. 1, and is supported on one side against the membrane 5 and on the other side against an adjustably disposed spring plate 12 which is slidably arranged relative to said carrier 10. Accordingly, this valve spring 11 loads the membrane 5 in the open direction so that the membrane valve is always open when not in operation.

The bottom plate 3, as best shown in side elevation of FIG. 1, is sculptured to provide chambers 8 (FIG. 2), that are inter-connected with each other by an annular channel 13 which provides for communication between these chambers consecutively, so that a fluid current can flow from the first chamber to the second and then to the third and fourth, but not, however, directly from the first to the fourth. A fuel line 34 extends from a fuel container 33 through a continually feeding fuel pump 35 and a nipple 14 to the first chamber 8. From the fourth chamber 8 a fuel line 38 extends through a nipple 37 to a pressure holding valve 39 and from there back to the fuel container 33.

A metal bushing 17 is arranged in an axial bore 16, which penetrates the entire apparatus. This bushing is secured against longitudinal and rotary movement by an elastic sealing bushing 18 (which can consist of rubber) with the sealing bushing 18 being compressed by a threaded plug 19 rotatably positioned in said housing in abutment against a disc 20, which is supported in an annular groove in the bottom cover plate 3 and beneath the intermediate plate 2. This construction thus prevents any inadvertent leakage between the respective elements comprising the assembly.

A distributing slide valve 21, which has an annular groove 22, slides axially in the bushing 17 against the force of a spring 15 that is received in a blind bore in the plug 19. Vertical grooves 23, are located in the bushing 17, which are connected with the inner bore of the bushing by means of exactly parallel similar vertical grooves or slots 24 (control grooves). Depending on the position of the distributing slide valve 21, the annular groove 22 opens the control groove 24 to a variable degree. Radial bores 25 are also disposed in the bushing to provide a constant connection between the annular groove 22 and the channel 26 arranged in the bottom cover plate through the channel formed by the intermediate plate 2, the sealing bushing 18 and the metal bushing 17. From the annular channel 26, radially extending channels 27 (FIG. 2) lead to the channel 13, so that the channel 26 is connected with the chamber 8 of the membrane control valve. The vertical grooves 23 disposed in the bushing 17 are connected with the chamber 7 of the membrane control valve through channels 28 so that each membrane control valve has a vertical groove 23 with its communicating control slot 24. It is to be understood that the chambers 7 of these membrane control valves are separated from each other.

The plate 12 is slidable relative to the stem of valve carrier 10 and is urged upward by spring 11 against an adjusting means 45. The adjusting means 45 is arranged in a threaded bore 46 and projects angularly into the chamber 7, this angularity aiding in meeting space requirements. The spring plate includes a chamfered surface corresponding to the angle of the adjusting screw 45 and is disposed so that nose 47 abuts thereagainst. In lieu of the adjusting means 45, a rigid rod, guided in a bore could also be used. For sealing and securing the adjusting means 45 against turning, a suitable gasket 49 can be inserted in a groove provided in the head 48 with the gasket 49 arranged to lie against the wall of the bore 50 which surrounds the head 48.

OPERATION

The method of operation of the fuel metering and volume divider valve is as follows:

The fuel flows out of the fuel container 33 through the line 34, thence through the pump 35 and into one of the chambers 8 of the membrane control valves and thereafter travels through the channel 13 to the other chambers 8 of the further membrane control valves until the unused portion returns to the fuel container 33 through the nipple 37, the line 38 and the pressure holding valve 39, which valve determines the pressure in the divider system. By means of these through-currents, the collecting of air bubbles beneath the membranes is substantially prevented. The remaining portion of the fuel flows through the channels 27, which are sufficiently long to effect a diminution of disturbance in the fuel traveling to the channel 26. It is possible that pressure losses in the channel 13 cannot be avoided with such currents, but since it is a prerequisite for an even control, that the pressure in the channel 26 is an intermediate value between the higher entering pressure and the lower pressure at the exit from the channel 13, i.e. the chambers 8 of the membrane control valve, the channels 27 (FIG. 2) branch out at radially opposite positions on the channel 13, so that the distance of the first branch from the feed position of the fuel is the same as the distance from the last branch to the fuel exit.

Part of the fuel flows from this channel 26 through the radial bore 25 into the annular groove 22 of the distributing slide valve. From the annular groove 22 the fuel flows through the control grooves 24, where it is metered, into the vertical grooves 23, and from there it travels through the channel 28 into the chambers 7 of the membrane control valve.

The stiffness of the membrane 5 and the force of the valve spring 11 are chosen so that when the pressure changes between the two chambers 7 and 8, the membrane control valve also changes relative to the current flow area between the membrane and the valve seat, until the desired pressure is again attained. This is achieved in an extraordinarily short time by means of this flat seat valve, because even a small stroke of the membrane changes the current flow area to a large degree. The small membrane stroke causes on the other hand, to change only slightly, so that the regulation can continue very precisely, i.e. the pressure of the fuel independent of the flowing volume is nearly constant.

In order to harmonize adjustment of the individual valves, or to change to another value, it is also conceivable within this concept to provide an adjusting screw 45 as an adjusting member, through which the spring plate 12 is slidably situated on the projecting section of the valve seat carrier 10 in the chamber 7, and thereby makes the tension of the valve spring 11 variable.

What is claimed is:

1. In a diaphragm valve having a housing including: means defining a chamber; a flexible diaphragm forming a movable part of the valve, said diaphragm being clamped by the chamber defining means so as to extend across the chamber and divide same into two chambers through which pressurized liquid flows; means defining a valve seat, said valve seat being positioned in one of the chambers in operative proximity to the diaphragm, the improvement comprising:

(a) an apertured plate means including a chamfered portion slidably disposed relative to said valve seat and supported by resilient means positioned between said plate means and said diaphragm; and (b) means mounted exteriorly of said valve housing directly engageable with said plate means to apply tension to said resilient means, said means mounted exteriorly of said housing projecting into said one chamber at an angle relative to said valve seat and including an adjusting element which enters said housing at an angle that corresponds to said chamfered portion.

2. A valve according to claim 1, in which said means mounted exteriorly of said housing includes a threaded body and is secured in said housing.

3. A valve according to claim 2, in which said threaded body includes a headed portion arranged to be sealed in said housing and capable of preventing inadvertent rotary movement of said threaded body.

* * * * *